June 13, 1967  W. STRASSER  3,324,593
EQUIPMENT AND PROCESS FOR CULTIVATING
USEFUL AND ORNAMENTAL PLANTS
Filed July 12, 1965  2 Sheets-Sheet 2
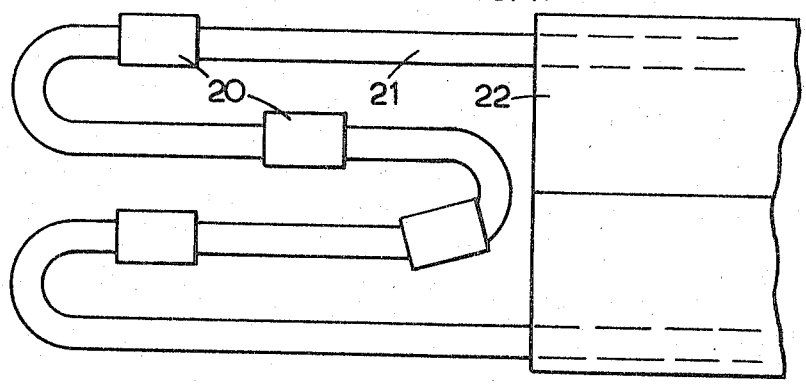
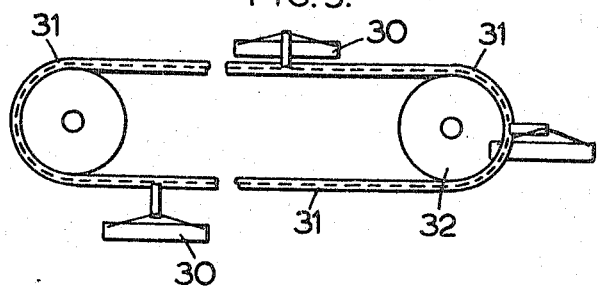
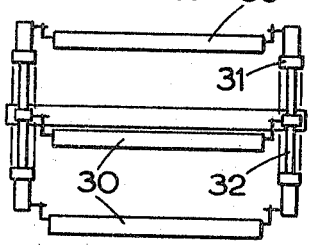
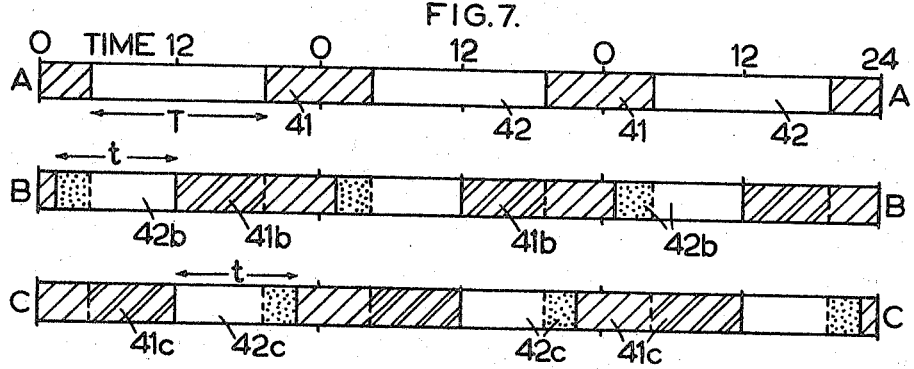
INVENTOR
WILLI STRASSER
By Shoemaker and Mattare
ATTYS.

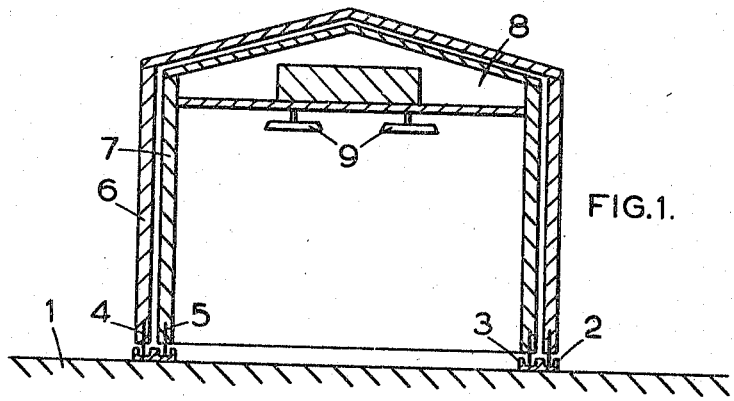
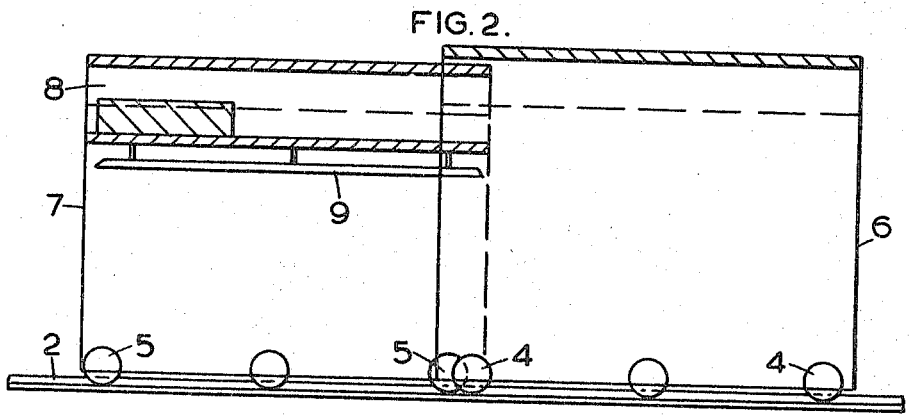
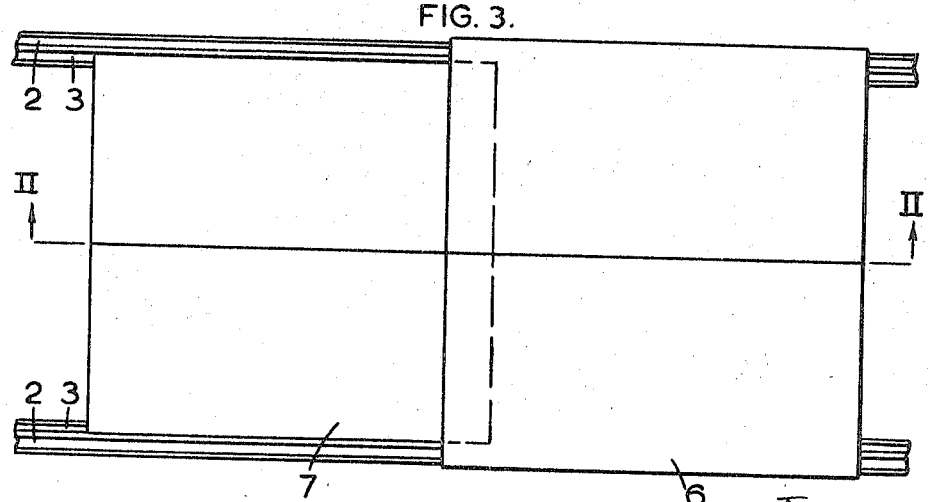

United States Patent Office 3,324,593
Patented June 13, 1967

3,324,593
EQUIPMENT AND PROCESS FOR CULTIVATING
USEFUL AND ORNAMENTAL PLANTS
Willi Strasser, Gartnerei 3600, Thun, Switzerland
Filed July 12, 1965, Ser. No. 471,252
Claims priority, application Switzerland, July 14, 1964,
9,259/64; Dec. 2, 1964, 15,576/64
2 Claims. (Cl. 47—58)

Equipment for cultivating most different kinds of useful and ornamental plants (vegetables, flowers, fruit plants) is already known, for example stationary buildings such as hothouses, greenhouses, conservatories, hotbeds, climatic chambers, artificially illuminated chambers and the like, as well as portable equipment such as coverings. Such equipment permits partial artificial production of the climatic conditions necessary for the growth of the plants.

On the other hand it is known that several growth factors must co-operate in a specific manner in order to achieve optimum development of the plants. The most important growth factor is light but other important growth factors include the humidity of the earth and ambient air, the temperature, the ground conditions in a physical respect (e.g. vegetable moulds), in a chemical respect (nutrients) and in a biological respect (bacteria).

Light is therefore particularly important as a growth factor for the cultivation of plants because it exerts a stimulus on the plants for controlling the generative growth. This is very important, for example, in the production of salad vegetables which should not run to seed.

The amount of light received by the plants every 24 hours is decisive to the development of most plants depending on the quality, intensity and duration. A difference is made between short-day plants, long-day plants and neutral-day plants. Short-day plants are those which achieve blossoming in a length of day below 13 hours; long-day plants require at least 13 hours of light per day; neutral-day plants achieve blossoming regardless of the length of day. For example, long-day plants such as radishes are prevented from running to seed by short-day treatment and it is generally possible to influence the growth of the plants by suitably controlling the light factor.

It is desired to give plant cultivation the conditions which are most favourable for a particular kind of growth, e.g. vegetative growth, whilst maintaining the maximum of economy during cultivation. The aforementioned optimum conditions include, for example, that the period for achieving the desired degree of cultivation be the shortest possible, that a desired degree of cultivation be achieved on a certain day, etc.

The object of the invention is not achieved easily. One need merely consider what will happen if one uses, say, an opaque foil for the day time screening of a plant that is being cultivated in a hothouse under short-day conditions. The temperature in the hothouse is still so high that the plants will breathe in the form of carbon dioxide practically all the carbon that has been assimilated in the light. This is because it is just not sufficient to vary or exclude one of the growth factors, namely the light, when simulating night time conditions.

The aim underlying the present invention is based on the above and still other considerations and it is fulfilled in that the cultivated plants are subjected to optimum conditions by converting the natural growth conditions into growth conditions which are designed to serve a particular purpose, maximum economy being ensured by the best possible utilization of the conditions that are offered by nature. Accordingly, the invention consists of combined cultivating equipment and a process for utilizing this cultivating equipment according to purpose.

The cultivating equipment according to the invention comprises two cultivating chambers which preferably have substantially equal useful areas, one of the chambers—the artificial chamber—permitting the artificial production of all growth factors, whilst the natural growth factors are utilized as far as possible in the other chamber—the natural chamber—the cultivating areas and cultivating chambers being movable relatively to one another.

The process according to the invention comprises bringing the cultivated plants to the desired degree of growth in the shortest possible time and in the most economical manner whilst accurately maintaining a treatment period of 24 hours by a suitable and optimum interchange of natural and artificial conditions as a result of mutual relative motion between the cultivating areas and cultivating chambers.

It is a further feature of the invention to equip the artificial chamber with means permitting all the growth factors to be regulated, for which purpose the artificial chamber comprises a complete air conditioning installation, black-out equipment, artificial illumination and artificial irrigation, whilst the natural chamber consists in principle of a simple greenhouse that can be heated.

The invention can be realised by arranging the plants on movable beds which are successively brought into the artificial chamber and the natural chamber in the desired time relationship. The beds may be mounted on carriages, conveyor belts, floats or any other suitable transporting means.

The plants could also be planted on rotary members having a horizontal or vertical axis, the rotary members passing through the artificial and natural chamber at the desired speed.

These floats, rotary members or rotary discs are not embodied by the invention; any known device might be used. The inventor claims the use of such members only for the realization of his process.

In another embodiment of the invention, the cultivated plants are stationary whilst the artificial and natural chambers, or the artificial chamber alone, is or are made movable on rollers or other suitable means and move over the cultivated plants in the desired timed relationship, the artificial chamber being movable below the natural chamber in the case where only the former is movable.

Two examples of the invention will now be described with reference to the accompanying drawings wherein:

FIG. 1 is an end view of cultivating equipment,

FIG. 2 is a longitudinal section on the line II—II in FIG. 3,

FIG. 3 is a plan view of the equipment of FIGS. 1 and 2,

FIG. 4 illustrates a conveyor band for carrying the cultivating areas and movable in a horizontal plane, FIG. 5 shows a conveyor band carrying the cultivating areas but movable in a vertical plane, FIG. 6 is an end view of the FIG. 5 arrangement, and FIG. 7 is an explanatory diagram, graphically representing periods of artificial light, natural light, artificial darkness and natural darkness applied to the two adjacent cultivating areas over a period of three days.

In the cultivating equipment according to FIGS. 1 to 3, there are located above the cultivating area 1 a housing providing a natural chamber 6 and another housing providing an artificial chamber 7 which are movable by means of rails 2, 3 and rollers 4, 5. The natural chamber 6 and artificial chamber 7 are proportioned to one another with respect to size, so that one of them can be moved into the other. In the illustrated embodiment the chamber 7 can be transported into the chamber 6. By virtue of the double rails 2, 3, the mobile combination of chambers 6, 7 can be applied over any cultivating area. The artificial chamber 7 comprises an air conditioning installation 8 and an artificial illumination installation 9. Darkening equipment and humidifying equipment are also provided but not illustrated.

For ease of illustration, the chambers 6, 7 are shown open at their ends but are closed by known flexible walls which can be wound up. Movement of the chambers 6, 7 can take place with the aid of known traction means, if desired according to a predetermined programme which may be semi or fully automatically controlled.

In the diagrammatic illustration of FIG. 4, containers 20 for receiving the cultivating beds are mounted on a conveyor band 21. The conveyor band follows a serpentine path, part of which passes through the artificial chamber 22. This artificial chamber 22 is preferably of the same construction as the artificial chamber 7 with the only difference that chamber 22 is not necessarily movable.

FIGS. 5 and 6 illustrate an installation wherein the containers 30 serving to receive the cultivating beds are likewise mounted on a conveyor band. In this case the band comprises chains 31 passing over vertically arranged sprockets 32.

The teaching of the present invention can of course be realised with the aid of different constructions.

The process according to the invention is best explained by way of example with reference to the diagram of FIG. 7.

It is assumed that the aim is to cultivate short-day plants (optimum lighting period=$t$ hours) during the summer when there is natural light for T hours per day.

The strip A graphically represents the natural completion of time over a period of 3 days. The areas 41 represent night time whilst the areas 42 represent day light. The areas provided with double hatching represent periods of simulated night time whilst the dotted areas represent artificial light. The strips B and C represent two plant cultivations of equal area whose optimum period of illumination is symbolised by the areas $42b$, $42c$, whilst the areas $41b$, $41c$ indicate the period of darkness $(24-t)$. If $t=T/2$, then two cultivations of equal area can be cultivated without artificial light, i.e. only with the aid of artificial darkness, in as far as the cultivation B utilises the first half of day light whilst the cultivation C utilises the second half of natural day light. During a period of $T/2$, each cultivation is artificially kept dark with the aid of screens, temperature and possibly humidity variations in the artificial chamber, whereby the natural conditions of a summer night are exactly simulated.

If $t$ is larger than $T/2$ but smaller than T, which is the normal case and is illustrated in FIG. 7, then the cultivation B firstly receives fully air conditioned artificial light for the period $t-T/2$, then natural light for the period $T/2$, and then artificial darkness with full air conditioning for the period $T/2$. The cultivation C firstly receives fully conditioned artificial darkness for the period $T/2$, then natural light for the period $T/2$ and then fully conditioned artificial light for the period $t-T/2$.

It will be evident, firstly, that each cultivation passes through a constant and full cycle of 24 hours and, secondly, that the artificial and natural chambers are utilised alternately without any overlap, whereby readily to permit uniplanar operation. If it is desired to extend the process to three or more, say $n$, areas, then at least two, or rather $n-1$, artificial chambers will be necessary, which are only partially utilised. Further, it may then be the case that some cultivations receive *only* artificial light and/or artificial darkness and this is in conflict with the concept according to the invention.

A diagram analogous to FIG. 7 can be readily worked out for winter operation.

I claim:
1. A process of cultivating useful and ornamental plants comprising dividing the cultivating area of a plant cultivation into two parts of substantially equal areas, enclosing the respective areas by interchangeable chambers, one of said chambers receiving natural light and darkness, the other of said chambers being a dark chamber and providing therein artificial light and artificial darkness, alternately interchanging said chambers and maintaining like treatment periods for each of said parts over a 24 hour day, alternately interchanging said chambers a plurality of times during each 24 hour day, and timing said changes within said treatment period to achieve optimum plant growth.

2. The process of claim 1, wherein the chambers are interchanged at least three times during a 24 hour day and wherein each part receives a separate period of artificial light, a separate period of natural light, a separate period of artificial darkness and a separate period of natural darkness, and wherein the sum of said four periods equals 24 hours, and wherein the plants are brought to the desired degree of growth in the shortest possible time and in the most economical manner by thus supplementing the natural growth condition by artificial growth conditions.

References Cited

UNITED STATES PATENTS

| 1,896,433 | 2/1933 | Windeknecht | 52—67 |
| 2,244,677 | 6/1941 | Cornell | 47—17 |
| 2,789,668 | 4/1957 | Martin. | |

FOREIGN PATENTS

| 263,635 | 1/1927 | Great Britain. |

OTHER REFERENCES

Flowering and Fruiting of Plants as Controlled by the Length of Day, W. W. Gardner and H. A. Allard (Separate No. 852, from Yearbook of U.S. Dept. of Agriculture, 1920, pp. 377–400, only pp. 381–383, 387–389, and 394–397 relied upon).

ABRAHAM G. STONE, *Primary Examiner.*

P. A. RAZZANO, *Assistant Examiner.*